(12) United States Patent
Tanner et al.

(10) Patent No.: US 7,774,472 B2
(45) Date of Patent: Aug. 10, 2010

(54) SYSTEM AND METHOD FOR CROSS-AUTHORITATIVE CONFIGURATION MANAGEMENT

(75) Inventors: Ronald Martin Tanner, Provo, UT (US); Matthew John Sorenson, Lehi, UT (US); Rick James Carlson, Pleasant Grove, UT (US); David Evans Lewis, Springville, UT (US)

(73) Assignee: Novell, Inc., Provo, UT (US)

( * ) Notice: Subject to any disclaimer, the term of this patent is extended or adjusted under 35 U.S.C. 154(b) by 269 days.

(21) Appl. No.: 11/878,290

(22) Filed: Jul. 23, 2007

(65) Prior Publication Data

US 2009/0031026 A1    Jan. 29, 2009

(51) Int. Cl.
*G06F 15/173* (2006.01)
(52) U.S. Cl. .................. 709/226; 709/204; 709/225
(58) Field of Classification Search .......... 709/204, 709/225, 226
See application file for complete search history.

(56) References Cited

U.S. PATENT DOCUMENTS

| | | | |
|---|---|---|---|
| 7,313,813 B2* | 12/2007 | Rangan et al. | 726/5 |
| 7,631,033 B2* | 12/2009 | Zehler | 709/201 |
| 2002/0184182 A1* | 12/2002 | Kwan | 707/1 |
| 2003/0005100 A1* | 1/2003 | Barnard et al. | 709/223 |
| 2004/0107269 A1* | 6/2004 | Rangan et al. | 709/219 |
| 2004/0193887 A1* | 9/2004 | Foster et al. | 713/176 |
| 2006/0230282 A1* | 10/2006 | Hausler | 713/182 |

* cited by examiner

*Primary Examiner*—Wing F Chan
*Assistant Examiner*—Kostas Katsikis
(74) *Attorney, Agent, or Firm*—Pillsbury Winthrop Shaw Pittman LLP

(57) ABSTRACT

A system and method for cross-authoritative, user-based network configuration management is provided. Users log-in to a network using any device coupled to the network, and an identity manager may provide the user with a custom computing environment by verifying the user's identity and identifying content, assignments, and other configuration information associated with the user. For instance, the identity manager may retrieve a unique identifier assigned to the user, query one or more authoritative source domains based on the unique identifier, and deliver a computing environment assigned to the user. By seamlessly integrating multiple authoritative sources, administrators can make assignments to users across multiple authoritative source domains, and queries to the sources will always be up-to-date without having to perform synchronization processes.

16 Claims, 3 Drawing Sheets

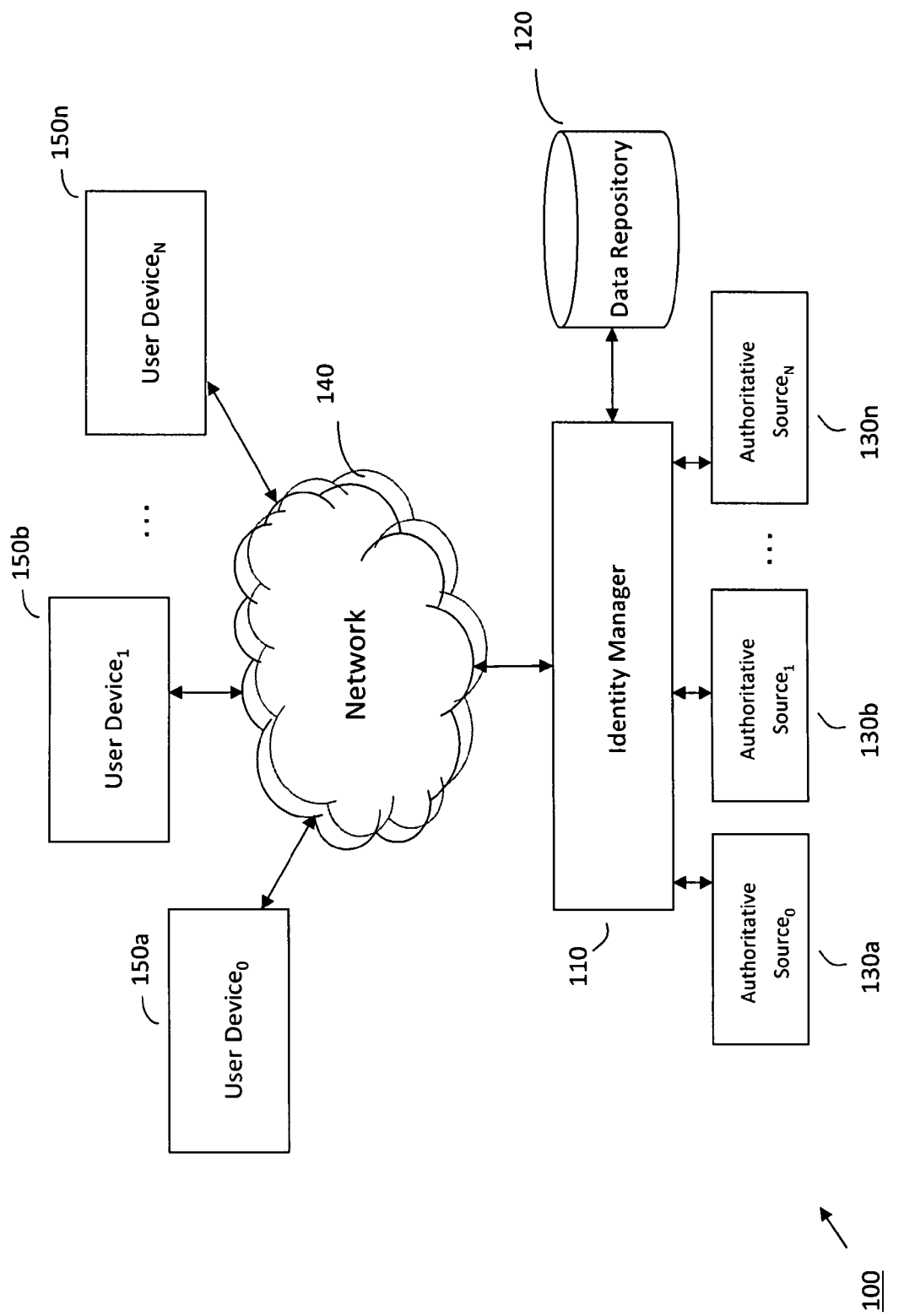

SYSTEM AND METHOD FOR CROSS-AUTHORITATIVE CONFIGURATION MANAGEMENT

FIELD OF THE INVENTION

The invention relates to user-based network configuration management using a plurality of integrated authoritative sources.

BACKGROUND OF THE INVENTION

Managing a network infrastructure often entails accounting for user, device, or other identities in order to control access rights (e.g., permissions or authorizations to access certain network resources), user assignments (e.g., applications or policies assigned to a user), or otherwise manage a network based on users. As such, many network implementations incorporate a form of identity management in order to simplify user management processes. For example, identity management solutions often include an authoritative source (e.g., a directory service) that identifies a network's resources, users' rights to access the resources, and application or policy assignments for specific users or devices, among other things. As a network infrastructure grows and changes, however, effective user-based management often becomes difficult, particularly when heterogeneous systems include different authoritative sources or identity management products.

For example, various groups, departments, or other classes of network users or devices may have different requirements resulting in different authoritative sources being implemented within the network. In another example, a network may be upgraded or migrated to a new authoritative source, but an administrator may prefer to manage new users with the new source and preserve a previous authoritative source for existing users. Although there can be many reasons for using multiple authoritative sources, existing systems often cannot provide seamless integration and interoperability among the various authoritative sources. For example, many existing integration efforts focus on use of synchronization modules that dredge authoritative sources, discover users, and build a searchable database. This type of system suffers from various drawbacks, including a lack of a consistent way to create identity-aware applications, while shielding programmers from underlying differences in the authoritative sources. Moreover, synchronization modules may only search authoritative sources at periodic intervals; or upon request, or in other ways that do not provide real-time integration and interoperability. As such, users requiring immediate access to resources may be restricted from accessing critical resources until completion of the synchronization process, potentially causing unnecessary delays, or decreases in productivity, among other problems.

Existing systems suffer from these and other problems.

SUMMARY OF THE INVENTION

According to various aspects of the invention, a system and method for cross-authoritative configuration management may address these and other drawbacks of existing systems. The invention may be used to manage network configurations using multiple authoritative sources, enabling full interoperability and seamless integration with any number of authoritative sources (e.g., using an identity manager having native support for the authoritative sources). As such, devices, software, policies, group memberships, or other network resources can be directly assigned to a network user based on the user's identity, regardless of where the user accesses the network, and regardless of which authoritative source or sources include the user's identity information.

According to various aspects of the invention, an identity manager may be coupled to a network, and may provide a single point of control for configuring or otherwise managing one or more users across a plurality of authoritative sources. Users may log-in to the network using any suitable device coupled to the network, and the identity manager may provide the user with a computing environment customized for the user, regardless of which device the user employs. For instance, upon the user logging in, the identity manager may verify the user's identity by retrieving a unique identifier assigned to the user. The identity manager may then query one or more authoritative source domains based on the user's unique identifier to identify a computing environment (e.g., assignments, applications, desktop configurations, policies, group memberships, content, etc.) associated with the user. Each user may be provided with their own customized computing environment, which can be tailored to specific needs of the user, a group to which the user belongs, a business role of the user, or otherwise, as will be apparent. As such, users may be free from being limited to using any specific desktop, workstation, laptop, or other device. Moreover, by directly integrating with the authoritative sources, the identity manager may provide native, full, and immediate real-time integration with any directory or other source of managed users. Whenever a change occurs in any of the authoritative sources, subsequent queries will immediately reflect the change with no need for synchronization. Further, by seamlessly integrating multiple authoritative sources, administrators can make assignments to users across multiple authoritative source domains (e.g., a group of users can include a first set of users from a first authoritative source, a second set of users from a second authoritative source, etc.).

According to various aspects of the invention, integrated authoritative sources enables real-time, identity-based management having simple service delivery and accurate user device configurations. Using this dynamic approach, desktop changes, application assignments, or other aspects of a computing environment can be recognized immediately whenever a change occurs to a network user's account, across plural authoritative sources, without limitation. As such, a network infrastructure can be implemented to manage user desktops, devices, or other computing environments based on any number of network identities, including any suitable combination of user business role, location, group membership, or other characteristics. Accordingly, applications, content, and other information technology resources can be delivered based on personal needs of each user. From a single point of control, administrators can assign applications to users, regardless of which authoritative source domain (or combination of source domains) the users reside within. Existing authoritative sources can be integrated seamlessly (e.g., via a web services architecture) without requiring any changes to source schemas. Further, the sources can be integrated without specialized directories or authoritative sources (e.g., a searchable LDAP abstraction), or synchronization of passwords or information between directories. Rather, the identity manager may store information relating to globally unique identifiers assigned to directory objects by the integrated authoritative sources. The identifiers may be used by the identity manager to formulate direct, lightweight queries to the authoritative source itself. All other information, including assignments between content, users, or devices, among other things, can be stored in the authoritative source and retrieved via the unique identifiers. For example, the identity manager can look up tables (e.g., Structured Query Language tables) to determine what content to deliver to users, which devices the users currently run, or other information, and the content can then be delivered to the appropriate place to users having proper access rights. Further, by using multiple directories or authoritative sources, assignments can be managed across multiple trees, domains, or other source configurations. For example, user groups can be created containing users from different sources (e.g., mixing users from different trees, domains, or other source configurations within a single group).

Other objects and advantages of the invention will be apparent to those skilled in the art based on the following drawings and detailed description.

BRIEF DESCRIPTION OF THE DRAWINGS

FIG. 1 illustrates an exemplary system for managing network configurations based on multiple authoritative sources according to various aspects of the invention.

DETAILED DESCRIPTION

Figure 2A:
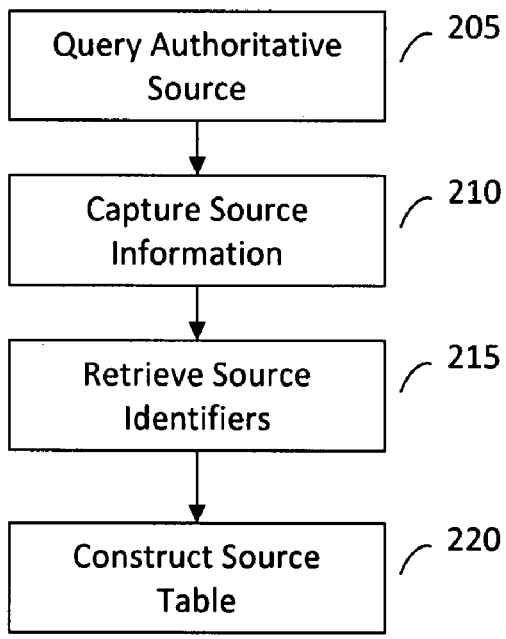
FIGS. 2a-b illustrates exemplary methods for establishing a single point of control over multiple authoritative sources according to various aspects of the invention.

Referring to FIG. 1, an exemplary system 100 for managing network configurations based on multiple authoritative sources is illustrated according to various aspects of the invention. System 100 may be used for, among other things, directly assigning devices, software, policies, group memberships, or other network resources to a user based on an identity of the user. Further, as shown in FIG. 1, system 100 can fully interoperate and seamlessly integrate with any number of authoritative sources 130a-n, for example, by way of an identity manager 110 including native support for the authoritative sources 130a-n. For example, in various implementations, identity manager 110 may be Novell ZENworks® Configuration Management, and the authoritative sources 130a-n may include Novell® eDirectory™, Microsoft Active Directory, or any other authoritative source that can be used to manage users (e.g., PeopleSoft DB, OpenLDAP, etc.).

According to various aspects of the invention, the identity manager 110 may be coupled to a network 140, and may provide a single point of control for configuring or otherwise managing one or more users. A user may log-in to the network 140 using any of a plurality of devices 150a-n coupled to the network 140, and identity manager 110 may provide the user with a customized computing environment regardless of which device 150 the user employs to log in to the network 140. For instance, upon the user logging in, identity manager 110 may verify the user's identity by retrieving a unique identifier assigned to the user from a data repository 120. Identity manager 110 may query one or more of authoritative source domains 130a-n based on the user's unique identifier in order to identify a computing environment (e.g., assignments, applications, desktop configurations, policies, group memberships, content, etc.), validate a user, retrieve user attributes (e.g., e-mail address, name, location, etc.), or perform other user management tasks. For example, each user may be provided with their own customized computing environment, which can be tailored to specific needs of the user, a group to which the user belongs, a business role of the user, or otherwise, as will be apparent. In another example, the user's unique identifier can be used to authenticate or otherwise validate the user by incorporating credentials provided by the user on log-in (e.g., user name, password, etc.) into a validation call that also includes the user's unique identifier, and the validation call may be passed to a directory or other authoritative source to validate the user.

As such, the user may be provided with the customized computing environment regardless of where the user logs in to the network 140, freeing users from being tethered to any specific desktop, workstation, laptop, or other device. Moreover, by directly integrating with the authoritative sources 150a-n, identity manager 110 may provide native, full, and immediate real-time integration with any directory or other source of managed users. Thus, a user can be managed using one or more different domains, directories, or other authoritative sources (e.g., a user's assignments, attributes, etc. could be managed in an Active Directory domain, while a device being used by the user could be managed in a different authoritative source). Whenever a change occurs in any of the authoritative sources 150a-n, subsequent queries to the changed authoritative source 150 may immediately reflect the change without having to synchronize a database. Further still, by seamlessly integrating multiple authoritative sources 150a-n, administrators may make assignments to users across multiple authoritative source domains 150a-n. For instance, in one example, an administrator may create a group having a first set of users managed in a first authoritative source 130a, a second set of users managed in a second authoritative source 130b, or otherwise. Thus, identity manager 110 provides a single point of control for administrators to control what users (or groups of users) receive which assignments based on user identities managed within plural authoritative sources 150a-n.

Figure 2B:
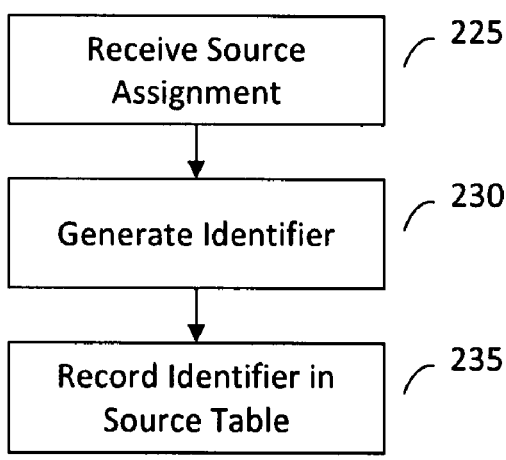

Referring to FIGS. 2a-b, an exemplary method for establishing a single point of control over multiple authoritative sources is illustrated according to various aspects of the invention. By establishing the single point of control (e.g., in an identity manager coupled to the authoritative sources), software, policies, configurations, group memberships, or other assignments can be applied to users managed under any of the authoritative sources, or across the authoritative sources, or otherwise, as will be apparent. For instance, in an operation 205, multiple authoritative sources may be integrated with an identity manager to provide the single point of control over all of the sources. When initially linking the authoritative sources, the identity manager may query the sources in operation 205 (e.g., via a Lightweight Directory Access Protocol query), and user identity information may be captured from the sources in an operation 210.

For example, an authoritative source may assign unique identifiers (e.g., globally unique identifiers) to objects (e.g., directory objects) managed in the authoritative source. As such, in an operation 215, authoritative source information may be captured by retrieving the assigned unique identifiers from the authoritative sources. The unique identifiers can relate to users, devices, content (e.g., applications or policies), or other information for entities managed by the authoritative sources. Thereafter, in an operation 220, the unique identifiers may be stored in a table and subsequently used to configure or manage a user's computing environment.

As such, network users can be managed using any suitable authoritative source or combination thereof. Administrators can therefore manage applications, policies, group assignments, or other information technology resources intended for a user, a group of users, or otherwise without having to perform user account replication or synchronization. For example, as illustrated in FIG. 2b, an administrator can manage user assignments directly in one or more authoritative sources in an operation 225. Assignments may be made in the authoritative source based on a user, a container, a group, or other configuration, as will be apparent. Once the assignment has been made, the authoritative source may generate a unique identifier for the assignment in an operation 230, and the unique identifier may be added to the source table in an operation 235. As will be apparent, assignments can include software assignments, policy assignments, group membership assignments, or other assignments. For example, an administrator could create a group to contain a plurality of users, and once the users have been added to the group in the authoritative source, the administrator can make assignments to the entire group. Moreover, the users within the group could be from any number of authoritative source domains, directory trees, or otherwise, and the assignment may be validly applied across all of the sources.

Figure 3:
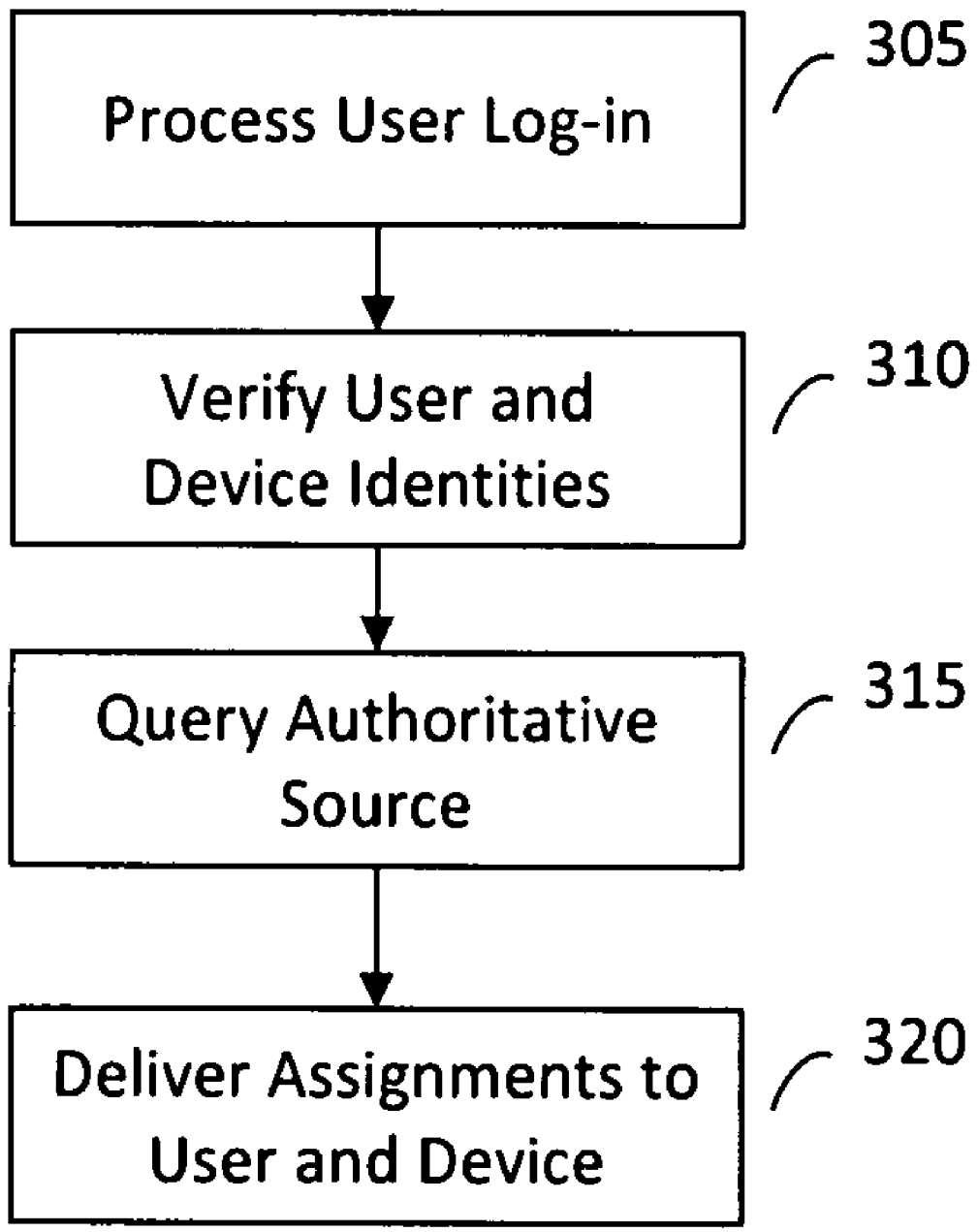
FIG. 3 illustrates an exemplary method for providing assignments to users and/or devices based on multiple authoritative sources according to various aspects of the invention.

Thus, the identity manager can be linked to various user unique identifiers, as well as user groups and containers in the authoritative sources. Administrators can make assignments to individual users, groups of users, containers of users, or in other ways, and a user will receive any assignments applied to groups, containers, sub-groups or sub-containers, or other abstractions to which the user belongs. As such, whenever the identity manager requires information from a directory object in a linked authoritative source, the identity manager will query the source with an appropriate unique identifier to recover the data. For instance, as illustrated in FIG. 3, a user may log in to the identity manager from any device coupled to the network. The user's log in may be processed in an operation 305, and the user's identity, group memberships, and other identification characteristics may be verified in an operation 310. For example, the identity manager may retrieve a unique identifier assigned to the user from the source table, and one or more authoritative sources may be queried in an operation 315 based on the identifier. The user's group assignments, software assignments, desktop configurations, policy assignments, or other information technology resources may be identified by the authoritative source, and an operation 320 may then include delivering the identified assignments to any suitable device from where the user has logged in.

Employing features described herein, network administrators may easily enable real-time, identity-based management having simple service delivery and accurate user device configurations. Using this dynamic approach, desktop changes, application assignments, or other aspects of a computing environment can be recognized immediately whenever a change occurs to a network user's account, across plural authoritative sources, without limitation. As such, a network infrastructure can be implemented to manage user desktops, devices, or other computing environments based on any number of network identities, including any suitable combination of user business role, location, group membership, or other characteristics. Accordingly, applications, content, and other information technology resources can be delivered based on personal needs of each user. From a single point of control, administrators can assign applications to users, regardless of which authoritative source domain (or combination of source domains) the users reside within. Existing authoritative sources can be integrated seamlessly (e.g., via a web services architecture) without requiring any changes to the sources' schemas. Further, the sources can be integrated without requiring a specialized directory or authoritative source (e.g., a searchable LDAP abstraction) or synchronization of passwords or information between directories.

Information stored at the identity manager can be limited to the globally unique identifiers assigned to directory objects by the authoritative sources, which may be used to formulate direct, lightweight queries to the authoritative source itself. Other information, including assignments between content, users, and devices, among other things, can be stored in the authoritative sources, tables or databases associated with the identity manager, or otherwise, and the identity manager may retrieve such assignments, associations, and other information via the unique identifiers. For example, a user's rights to applications, content, or other rights can be identified by the identity manager looking up tables (e.g., Structured Query Language tables) according to a user's unique identifier to determine what content to deliver to users, which devices the users currently run, or other information, and the content can then be delivered to the appropriate place to users having proper access rights. Further, by using multiple directories or authoritative sources, assignments can be managed across multiple trees, domains, or other source configurations. User groups can be created containing users from different sources (e.g., mixing users from different trees, domains, or other source configurations within a single group). As such, by storing assignments in the identity manager rather than the authoritative sources, the identity manager can provide a single point of control for managing user-based configurations using any suitable combination of the authoritative sources.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for cross-authoritative configuration management, comprising:

integrating a plurality of authoritative sources with an identity manager that natively supports schemas used in the plurality of authoritative sources, wherein the identity manager integrated with the plurality of authoritative sources operates on a processor and provides a single point of control for managing assignments that define access rights across the plurality of authoritative sources;

determining the assignments that define the access rights for at least one of a plurality of users that are managed across the plurality of authoritative sources, wherein determining the assignments that define the access rights for the at least one user includes:

capturing, by the identity manager operating on the processor, identifiers for any directory objects assigned to the at least one user in the plurality of authoritative sources, wherein the directory objects assigned to the at least one user in the plurality of authoritative sources include the assignments that define the access rights for the at least one user across the plurality of authoritative sources;

retrieving, by the identity manager operating on the processor, a globally unique identifier assigned to the at least one user from a data repository coupled to the identity manager; and storing, by the identity manager operating on the processor, the globally unique identifier assigned to the at least one user in a table that associates the globally unique identifier with the identifiers for the directory objects assigned to the at least one user in the plurality of authoritative sources; and delivering a customized computing environment to the at least one user, wherein delivering the customized computing environment to the at least one user includes:

receiving, at the identity manager operating on the processor, a login request from a device in communication with the identity manager over a network, wherein the login request includes one or more credentials provided by the at least one user;

validating, by the identity manager operating on the processor, the one or more credentials included in the login request, wherein the identity manager queries at least one of the directory objects assigned to the at least one user in the plurality of authoritative sources to validate the one or more credentials included in the login request;

retrieving, by the identity manager operating on the processor and in response to validating the one or more credentials included in the login request, the assignments that define the access rights for the at least one user from the directory objects in the table that are assigned to the at least one user in the plurality of authoritative sources; and delivering, by the identity manager operating on the processor and in response to validating the one or more credentials included in the login request, the customized computing environment to the device, wherein the customized computing environment delivered to the device includes the assignments in the directory objects in the table that are assigned to the at least one user.

2. The method of claim 1, wherein the directory objects assigned to the at least one user in the plurality of authoritative sources further include one or more attributes associated with the at least one user, one or more attributes associated with one or more groups that include the at least one user, and one or more attributes associated with one or more containers that include the at least one user.

3. The method of claim 2, wherein the directory objects assigned to the at least one user in the plurality of authoritative sources further include one or more assignments associated with the one or more groups and the one or more containers that include the at least one user, the assignments including one or more of software, policies, group memberships, content, or devices associated with the at least one user, the one or more groups that include the at least one user, and the one or more containers that include the at least one user.

4. The method of claim 2, the attributes including one or more of e-mail addresses, names, locations, or descriptive information associated with the at least one user, the one or more groups that include the at least one user, and the one or more containers that include the at least one user.

5. The method of claim 3, wherein at least one of the one or more groups that include the at least one user further include one or more other users, and wherein the at least one user and the one or more users in the group are managed by different ones of the plurality of authoritative sources.

6. The method of claim 1, further comprising updating, by the identity manager operating on the processor, one or more of the identifiers for the directory objects in the table that are assigned to the at least one user in response to the identity manager detecting a change to the directory objects associated with the one or more identifiers in the plurality of authoritative sources.

7. The method of claim 3, wherein the customized computing environment delivered to the device further includes the assignments in the directory objects assigned to the at least one user in the table that are associated with the one or more groups and the one or more containers that include the at least one user.

8. The method of claim 1, wherein the identity manager formulates a Lightweight Directory Access Protocol query to capture the identifiers for the directory objects assigned to the at least one user in the plurality of authoritative sources.

9. A system for cross-authoritative configuration management, comprising:

a plurality of authoritative sources integrated with an identity manager that natively supports schemas used in the plurality of authoritative sources, wherein the identity manager integrated with the plurality of authoritative sources provides a single point of control for managing assignments that define access rights across the plurality of authoritative sources; and a data repository coupled to the identity manager, wherein the data repository stores a globally unique identifier assigned to at least one of a plurality of users that are managed across the plurality of authoritative sources; and one or more processors that execute the identity manager, wherein the one or more processors that execute the identity manager are configured to:

capture identifiers for any directory objects assigned to the at least one user in the plurality of authoritative sources, wherein the directory objects assigned to the at least one user in the plurality of authoritative sources include the assignments that define the access rights for the at least one user across the plurality of authoritative sources;

retrieve the globally unique identifier assigned to the at least one user from the data repository;

store the globally unique identifier assigned to the at least one user in a table that associates the globally unique identifier with the identifiers for the directory objects assigned to the at least one user in the plurality of authoritative sources;

receive a login request from a device in communication with the identity manager over a network, wherein the login request includes one or more credentials provided by the at least one user;

validate the one or more credentials included in the login request, wherein the identity manager queries at least one of the directory objects assigned to the at least one user in the plurality of authoritative sources to validate the one or more credentials included in the login request;

retrieve, in response to validating the one or more credentials included in the login request, the assignments that define the access rights for the at least one user from the directory objects in the table that are assigned to the at least one user in the plurality of authoritative sources; and deliver, in response to validating the one or more credentials included in the login request, a customized computing environment to the device, wherein the customized computing environment delivered to the device includes the assignments in the directory objects in the table that are assigned to the at least one user.

10. The system of claim 9, wherein the directory objects assigned to the at least one user in the plurality of authoritative sources further include one or more attributes associated with the at least one user, one or more attributes associated with one or more groups that include the at least one user, and one or more attributes associated with one or more containers that include the at least one user.

11. The system of claim 10, wherein the directory objects assigned to the at least one user in the plurality of authoritative sources further include one or more assignments associated with the one or more groups and the one or more containers that include the at least one user, the assignments including one or more of software, policies, group memberships, content, or devices associated with the at least one user, the one or more groups that include the at least one user, and the one or more containers that include the at least one user.

12. The system of claim 10, the attributes including one or more of e-mail addresses, names, locations, or descriptive information associated with the at least one user, the one or more groups that include the at least one user, and the one or more containers that include the at least one user.

13. The system of claim 11, wherein at least one of the one or more groups that include the at least one user further include one or more other users, and wherein the at least one user and the one or more users in the group are managed by different ones of the plurality of authoritative sources.

14. The system of claim 9, wherein the one or more processors that execute the identity manager are further configured to update one or more of the identifiers for the directory objects in the table that are assigned to the at least one user in response to the identity manager detecting a change to the directory objects associated with the one or more identifiers in the plurality of authoritative sources.

15. The system of claim 11, wherein the customized computing environment delivered to the device further includes the assignments in the directory objects assigned to the at least one user in the table that are associated with the one or more groups and the one or more containers that include the at least one user.

16. The system of claim 9, wherein the one or more processors that execute the identity manager formulate a Lightweight Directory Access Protocol query to capture the identifiers for the directory objects assigned to the at least one user in the plurality of authoritative sources.

* * * * *